Nov. 15, 1949   R. J. McCALL   2,488,217
WAGON UNLOADER AND MOTOR DRIVE UNIT THEREFOR
Filed Sept. 2, 1948
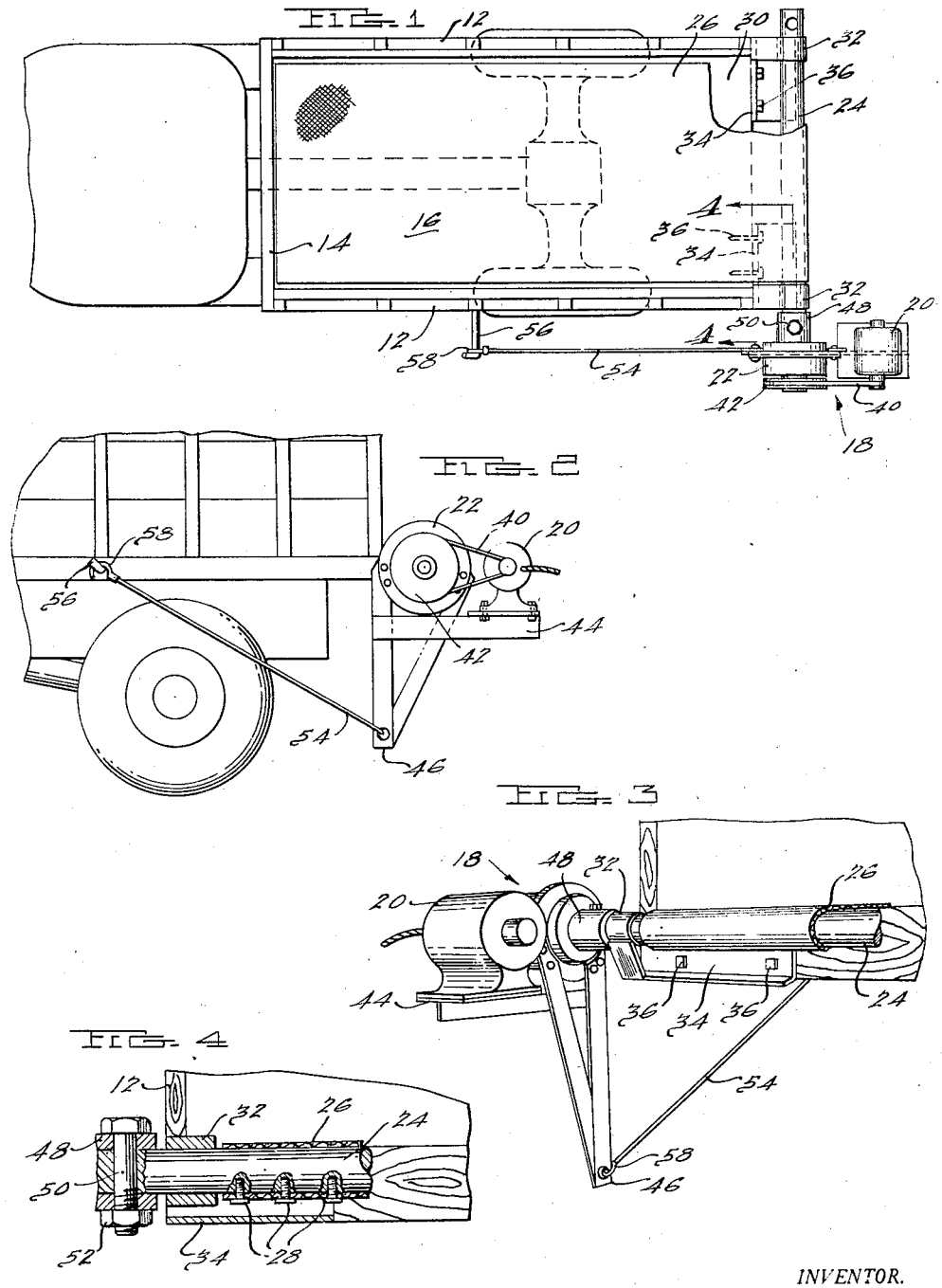
INVENTOR.
Robert J. McCall.
BY
E. J. Balluff
ATTORNEY.

Patented Nov. 15, 1949

2,488,217

UNITED STATES PATENT OFFICE 2,488,217

WAGON UNLOADER AND MOTOR DRIVE UNIT THEREFOR

Robert J. McCall, Columbus, Ohio, assignor to The Five Manufacturing Company, Columbus, Ohio, a corporation of Ohio Application September 2, 1948, Serial No. 47,366

7 Claims. (Cl. 214—83.34)

This invention relates to wagon unloaders and motor drive units therefor, and has particular reference to a novel and portable motor drive unit which is constructed and arranged so that it may readily be assembled with and disassembled from a wagon unloader so as to make it possible to use one motor drive unit to service a series of wagon unloaders.

This invention contemplates a motor driven wagon unloader in which the motor drive unit therefor is detachably mounted on the wagon in such a manner that the drive unit may readily be assembled to and disassembled from the wagon and the unloader, whereby one motor drive unit may be used to service a series of unloaders. In addition the invention contemplates a more compact and less expensive construction and arrangement for motor drive units for wagon unloaders and the like.

A principal object of the invention, therefore, is to provide a new and improved wagon unloader.

Another object of the invention is to provide a new and improved motor drive unit for wagon unloaders.

Another object of the invention is to provide a new and improved wagon unloader and motor drive unit therefor.

Other and further objects of the invention will be apparent from the following description and claims and will be understood by reference to the accompanying drawing, of which there is one sheet, which by way of illustration shows a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a fragmentary plan view of a vehicle having an unloader and motor drive unit embodying the invention associated therewith;

Fig. 2 is a fragmentary side elevational view thereof;

Fig. 3 is a perspective view of the motor drive unit mounted on the back end of a wagon; and Fig. 4 is a sectional view taken along the line 4—4 of Fig. 1.

As illustrated in the embodiment of the invention selected for purposes of illustration, a vehicle or wagon is provided with side walls 12 and front wall 14 forming a load holding and carrying space 16. The vehicle has associated with it a wagon unloader indicated generally at 18 and which as illustrated comprises an electric motor 20, a speed reduction unit 22, a roller 24, and a strip of flexible material 26, one end of the strip being secured to the roller 24 by means of a series of screws 28 so that upon rotation of the roller 24 in one direction the strip 26 will be wound upon the roller 24.

As shown in Fig. 1, the strip 26 is of substantially the same width as the load space 16 of the vehicle, and such strip extends forwardly to the front end of the load space just above the vehicle floor 30. The load carried in the space 16 rests upon the strip 26.

While a specific form of unloader is illustrated, the invention contemplates that other specific forms of unloaders than that illustrated may be employed without departing from the concept of the invention.

The roller 24 is supported in two bearings 32 which are carried by brackets 34 suitably secured to the back of the wagon or vehicle, for example by bolts 36. The strip 26 of flexible material, as previously indicated, is secured to the roller 24 and upon rotation of the roller about its axis, the strip 26 will be wound upon the roller. This winding of the strip 26 upon the roller will move the load carried by the strip 26 toward the back of the vehicle and will discharge such load as the strip 26 winds upon the roller.

The motor drive unit, as previously indicated, includes a motor 20 and a speed reduction unit 22, the belt 40 being driven by the motor 20 and arranged in driving relation with a pulley 42 of the speed reducing unit 22. The motor 20 and speed reducer 22 are mounted upon a frame 44 having a torque arm 46. The roller 24 projects laterally beyond the bearings 32, and a coupling member 48 forming the driven part of the speed reducing unit 22 telescopically receives one end of the roller 24. A bolt 50 forms a pin which extends through aligned holes in the coupling member 48 and the roller 24 for transmitting torque from the part 48 to the roller 24 in order to drive the same.

The roller 24 forms an actuating member for the unloader and is in turn driven by the motor 20 through the speed reducer unit 22. The coupling 48, 50 between the speed reducer 22 and the roller 24 also serves to support the drive unit 18 on the roller 24 and thereby on the wagon. By removing the nut 52 the bolt 50 may be removed so as to permit the quick removal of the drive unit 18 from the roller 24.

A cable 54 connected at one end to the torque arm and at its other end to a hook 56 on the vehicle serves to take the torque reaction of the drive unit 18 resulting from its turning the roller 24 about its axis. The end 58 of the cable may quickly be unhooked from the hook 56 so as to permit the disassembly of the drive unit from the roller 24.

Since the drive unit 18 is readily detachably connected to the unloader, it may be conveniently and quickly separated therefrom and used in connection with other unloaders for operating the same. In this way one motor drive unit may be employed for servicing a series of vehicles having unloaders built therein.

While I have illustrated and described a preferred embodiment of my invention, it is understood that this is capable of modification, and I therefore do not wish to be limited to the precise details set forth but desire to avail myself of such changes and alterations as fall within the perview of the following claims.

I claim:

1. In combination with a wagon having an unloader therefor including an actuating roller extending across the back of said wagon, bearing means on the wagon in which said roller is journaled for rotation, said roller projecting laterally beyond said bearing means, a motor drive unit for operating said unloader including a driven part coupled to said part of said roller which projects beyond said bearing means, said motor drive unit being supported by said roller, a torque arm on said unit and means connected to said torque arm and to said wagon so as to take the torque reaction of said unit during the driving of said roller thereby.

2. Structure according to claim 1 wherein said means comprises a cable, one end of which is detachably connected to a part of said wagon.

3. In combination with a wagon having an unloader therefor including an actuating roller extending across the back of said wagon, bearing means on the wagon in which said roller is journaled for rotation, a motor drive unit for operating said unloader, a coupling drivingly connecting said roller and said unit and means connected to said wagon and to said unit so as to take the torque reaction of said unit during the driving of said roller thereby, said coupling and said last mentioned means securing said unit in driving relation with respect to said roller and detachably supporting said unit on said wagon.

4. In combination with a wagon having an unloader therefor including an actuating member at the back of said wagon, means for supporting said member on the wagon, a motor drive unit for operating said unloader, coupling means detachably drivingly connecting said unit with said member, and means detachably and operably supporting said unit on said wagon, in driving relation with said actuating member, said coupling means forming at least part of said supporting means for said unit.

5. Structure according to claim 4 wherein said unit supporting means comprises a torque arm on said unit and means connected to said torque arm and to said wagon so as to take the torque reaction of said unit during the driving of said member thereby.

6. In combination with a wagon having an unloader therefor including an actuating roller extending across the back of said wagon, bearing means on the wagon in which said roller is journaled for rotation, a motor drive unit for operating said unloader including a driven part coupled to said roller, said motor drive unit being supported by said wagon at least partly through said driven part, and means connected to said unit so as to take the torque reaction of said unit during the driving of said roller thereby.

7. Structure according to claim 6 wherein said driven part forms a part of a quickly releasable coupling which drivingly connects said unit and roller and functions to support said unit on said roller.

ROBERT J. McCALL.

REFERENCES CITED

The following references are of record in the file of this patent:

UNITED STATES PATENTS

| Number | Name | Date |
| --- | --- | --- |
| 1,273,150 | Churchill | July 23, 1918 |
| 1,415,034 | Hoelscher | May 9, 1922 |
| 1,742,948 | Carlson | Jan. 7, 1930 |
| 2,355,226 | Mallory | Aug. 8, 1944 |